United States Patent
Rowe et al.

(10) Patent No.: US 9,493,653 B2
(45) Date of Patent: Nov. 15, 2016

(54) POLYMER MODIFIED BINDER AND PLANT MIX MODIFIER FOR ASPHALT AND PROCESS OF MAKING

(75) Inventors: Geoffrey M. Rowe, Perkasie, PA (US); Douglas Zuberer, Plymouth, MA (US); Jeffrey A. Sargeant, South Attleboro, MA (US); Frederick F. Fischer, Jr., Glenshaw, PA (US); Steve M. Grendzinski, Pittsburgh, PA (US); Richard W. Specht, Pittsburgh, PA (US)

(73) Assignee: Chase Corporation, Pittsburgh, PA (US)

( * ) Notice: Subject to any disclaimer, the term of this patent is extended or adjusted under 35 U.S.C. 154(b) by 771 days.

(21) Appl. No.: 13/042,908

(22) Filed: Mar. 8, 2011

(65) Prior Publication Data

US 2011/0269876 A1 Nov. 3, 2011

Related U.S. Application Data

(60) Provisional application No. 61/311,598, filed on Mar. 8, 2010.

(51) Int. Cl.
| | |
|---|---|
| *C08L 95/00* | (2006.01) |
| *C08K 3/00* | (2006.01) |
| *C08K 5/01* | (2006.01) |
| *C08K 5/20* | (2006.01) |

(52) U.S. Cl.
CPC .............. *C08L 95/00* (2013.01); *C08K 3/0033* (2013.01); *C08K 5/01* (2013.01); *C08K 5/20* (2013.01); *C08L 2555/22* (2013.01); *C08L 2555/52* (2013.01); *C08L 2555/74* (2013.01); *C08L 2555/84* (2013.01); *C08L 2555/86* (2013.01)

(58) Field of Classification Search
CPC .................. C08L 95/00; C08L 2555/86; C08L 2555/52; C08L 2555/74; C08L 2555/84; C08L 2555/22; C08K 3/0033; C08K 5/01; C08K 5/20
USPC ......................... 106/279, 789; 524/29, 59, 62
See application file for complete search history.

(56) References Cited

U.S. PATENT DOCUMENTS

| | | | |
|---|---|---|---|
| 5,460,649 A | | 10/1995 | Strassman |
| 5,711,796 A | * | 1/1998 | Grzybowski et al. ..... 106/281.1 |
| 6,027,557 A | * | 2/2000 | Hayner ........................... 106/279 |
| 2002/0042477 A1 | | 4/2002 | Jelling et al. |
| 2003/0037704 A1 | | 2/2003 | Bailey et al. |
| 2005/0101701 A1 | * | 5/2005 | Stuart et al. ..................... 524/59 |
| 2007/0112127 A1 | * | 5/2007 | Soediono et al. ............ 524/543 |
| 2008/0153945 A1 | | 6/2008 | Prejean et al. |
| 2008/0287570 A1 | | 11/2008 | Thayer et al. |
| 2009/0215930 A1 | * | 8/2009 | Dannert ........................... 524/59 |
| 2010/0170421 A1 | * | 7/2010 | Nguyen et al. ................ 106/789 |

FOREIGN PATENT DOCUMENTS

| | | | |
|---|---|---|---|
| EP | WO 2008/145758 | * | 12/2008 |
| EP | 2062943 | * | 5/2009 |
| ES | WO 2006/108887 | * | 2/2007 |
| KR | 10-0299950 | | 10/2001 |
| KR | 10-0700078 | | 3/2007 |
| KR | 10-0810564 | | 3/2008 |
| WO | WO 99/27018 | | 6/1999 |
| WO | WO 2006/009386 | | 1/2006 |
| WO | WO 2009/062925 | | 5/2009 |

OTHER PUBLICATIONS

Korean Office Action, with English Translation, application No. 10-2012-7025299, mailed Nov. 20, 2013, 15 pages.
Canadian Office Action, application No. 2,792,497, mailed Oct. 22, 2014, 3 pages.
"Chipseal," Wikipedia, accessed online <http://en.wikipedia.org/wiki/Chipseal> Feb. 17, 2015.
Edwards, Y. Influence of Waxes on Bitumen and Asphalt Concrete Mixture Performance. Division of Highway Engineering. 2009. 24 pages.
Giuliana et al. Flow Characteristics and Viscosity Functions in Asphalt Binders Modified by Wax. International Journal of Pavement Research and Technology. Mar. 2009. 10 pages.
International Preliminary Report on Patentability. PCT/US2011/027526. Mailed Nov. 8, 2012. 14 pages.

* cited by examiner

*Primary Examiner* — Angela C Scott
(74) *Attorney, Agent, or Firm* — Fish & Richardson P.C.

(57) ABSTRACT

The invention provides a polymer modified binder using an asphalt plant mix modifier comprising a mixture of thermoplastic polymers, comprising both elastomers and plastomers, blended with oils and dispersed in a powder medium to facilitate flow. The use of polymers in dry form has provides for a means of incorporating additives into asphalt that can be successfully performed within the normal range of temperatures used for the mixing and compaction of hot mix asphalt.

18 Claims, 9 Drawing Sheets

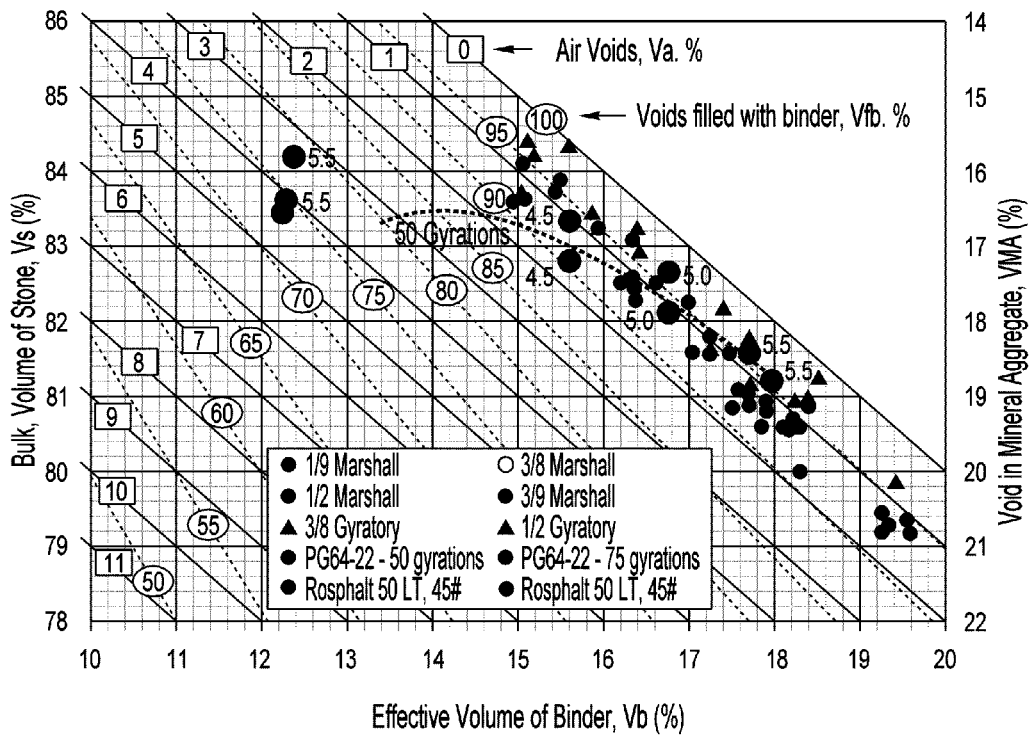

Notes:

1. Numbers in blue or green, adjacent to the data points represent the amount of unmodified PG64-22 within the mixture.

2. Data in grey points represent historical database of various designs conducted over 20-year period for projects in USA (States - NY, NJ, KY, MA, IA, WI, OH, ME, IN, WV) and Canada (Provinces - OM, NB, NS).

3. LT denotes use of reduced compaction temperature in production.

4. All data points in blue have used 50 gyrations in gyratory compaction device.

FIG. 2

| Property | Test Method | Results: Cores 4+5 |
|---|---|---|
| APA Rut Resistance, mm | AASHTO TP 63: (Temp. = 64 C; Hose Pressure: 100 psi Load 100 lbs; Cycles 8,000) | 2.4 | though higher or lower temperatures could be used.
POLYMER MODIFIED BINDER AND PLANT MIX MODIFIER FOR ASPHALT AND PROCESS OF MAKING

CROSS REFERENCE

This application claims the benefit of U.S. Provisional Patent Application No. 61/311,598, filed on Mar. 8, 2010, the contents of which are incorporated herein by reference in their entirety.

TECHNICAL FIELD

The present invention relates generally to a bituminous paving composition, and more particularly to a bituminous paving composition comprising a combination of a polymer modified binder and aggregate and a process of making the composition.

BACKGROUND

Asphalt is typically used to pave roads, bridges, racetracks, airport runways and taxiways, parking lots, bicycle paths, loading docks, and the like to provide surfaces for accommodating vehicular traffic. In the 1980's, asphalt was used to provide surfaces for vehicular traffic as layers of varying composition. Subsequent systems employed single layers of asphalt. In the single-layer systems, virgin asphalt was typically mixed with aggregate at a temperature of 130 to 190 degrees C.

The asphalt used in paving is a solid or semisolid bituminous material that is either naturally occurring or derived from petroleum refining processes and includes paraffinic and aromatic hydrocarbons and heterocyclic compounds. Aggregate such as crushed stone is typically incorporated into the asphalt. The most common type of asphalt used as a paving composition in the United States is hot mix asphalt (HMA) of which there is several variations or job mix formulations.

In one variation of HMA, an additive such as a polymer is added to an asphalt binder, the combination in turn being added to the asphalt, thereby resulting in a polymer modified binder (PMB). The PMB is then combined with aggregate in a facility to produce the HMA. The polymer facilitates the formation of a cohesive structure that affords a degree of flexibility to the asphalt to accommodate creep and stress. In this polymer modified HMA, the resulting mixture has the ability to accommodate creep or stress relaxation at low temperatures to minimize the potential for thermal and reflective cracking.

The PMB is generally shipped in tankers and stored in pre-heated containers at constant temperature before being combined with aggregate. PMB sometimes will require repeated cycles of agitation to maintain the PMB in a state of readiness for subsequent incorporation with aggregate and application as a paving material. The need for storage in this manner results in the need for HMA facilities to have additional tank storage space. In addition, complexities result if only small quantities of polymer modified HMA are required. In these instances the HMA facility may incur additional charges for a partial load of PMB or may opt to "waste" some premium PMB in a lower quality product since a minimum quantity of material is required in the tank for production of the polymer modified HMA to occur.

SUMMARY

In one aspect, the present invention resides in a plant mix modifier for the production of asphalt. Such a modifier comprises a thermoplastic material, oil, and filler additives (also referred to as "fillers") and is in a form that mixes into a hot mix asphalt at working temperatures associated with the production thereof and which conforms to Superpave specifications. In one embodiment, the plant mix modifier is defined by a polymer formulation comprising styrene-butadiene-styrene (SBS) polymer, polyethylene, wax, oil, and fillers. In any embodiment, the resulting modifier may be in the form of powder, pellets, granules, chips, flakes, or the like that may be combined with asphalt to provide a polymer modified binder (PMB).

In another aspect, the present invention resides in a polymer modified binder for a paving composition. Such a binder comprises an asphalt plant mix modifier in powder, pellet, flake, chip, or granule form that is mixable into a hot mix asphalt paving composition at a working temperature thereof. The asphalt plant mix modifier comprises an elastomer, a plastomer, oil, filler additives, and wax and is combinable with asphalt. The resulting paving composition conforms to Superpave specifications.

In another aspect, the present invention resides in a hot mix asphalt composition that conforms to Superpave specifications, the composition comprising a polymer modified binder, aggregate, and an asphalt binder. The polymer modified binder comprises a plant mix modifying composition in powder, pellet, flake, chip, or granule form, the plant mix modifying composition comprising an elastomer, a plastomer, oil, filler additives, and wax, as well as asphalt.

In another aspect, the present invention resides in a method of producing a free-flowing plant mix modifier for a hot mix asphalt for paving. Such a method comprises grinding an elastomeric polymer, pre-swelling the ground elastomeric polymer via the addition of an oil, adding ground plastomer and wax to the pre-swelled ground elastomeric polymer, combining the elastomeric polymer, oil, plastomer, and wax with a powder filler modifier, and forming the elastomeric polymer, oil, plastomer, wax, and powder filler modifier into a powder, pellet, granule, chip, or flake form.

In another aspect, the present invention resides in a method of forming an asphalt paving composition. This method comprises processing aggregate in an asphalt production plant to a temperature between 175 degrees C. and about 220 degrees C.; adding a plant mix modifier (PMM) comprising SBS, polyethylene, wax, oil, and fillers; dry mixing the aggregate and the PMM; adding a binder to the dry mixed aggregate and the PMM; and then adding a PG (performance-graded) asphalt binder to the PMM coated aggregate. The final mix production temperature is targeted to be in the range 155 degrees C. to about 190 degrees C. although higher or lower temperatures could be used.

Using comparative testing and various methods of analysis, the PMM having the polymer formulation of the present invention has been determined to exhibit a lower deformation rate at high temperatures (the high temperature performance is in the approximate range 50 to 100 degrees C. depending upon the choice of grading method using Tables 1 or 2 of AASHTO M320 specification) and a lower embrittlement quality (has lower temperature capability, e.g., around −34 degrees C. or lower) as compared to known formulations. Thus, the present invention offers desirable flexibility with regard to fatigue-resistance and impermeability and can be used to provide an asphalt paving composition that is less susceptible to rutting and shoving (the formation of ripples) as compared to known asphalt paving compositions.

The plant mix modifier of the present invention can be applied in a one-step application to provide a substantially impermeable layer that results in an asphalt paving composition having a waterproofing quality and wearing course in a single layer.

Use of the polymer formulation of the present invention also provides a system in which distressed and cracked asphaltic overlays typically seen with standard HMA or PMA designs can be eliminated. Furthermore, the PMM can be processed on and used with standard paving equipment.

BRIEF DESCRIPTION OF THE DRAWINGS

FIG. 2 is a graphical representation of test data pertaining to the characteristics of asphalt samples using Marshall and Gyratory testing methods.

DETAILED DESCRIPTION

Figure 1:
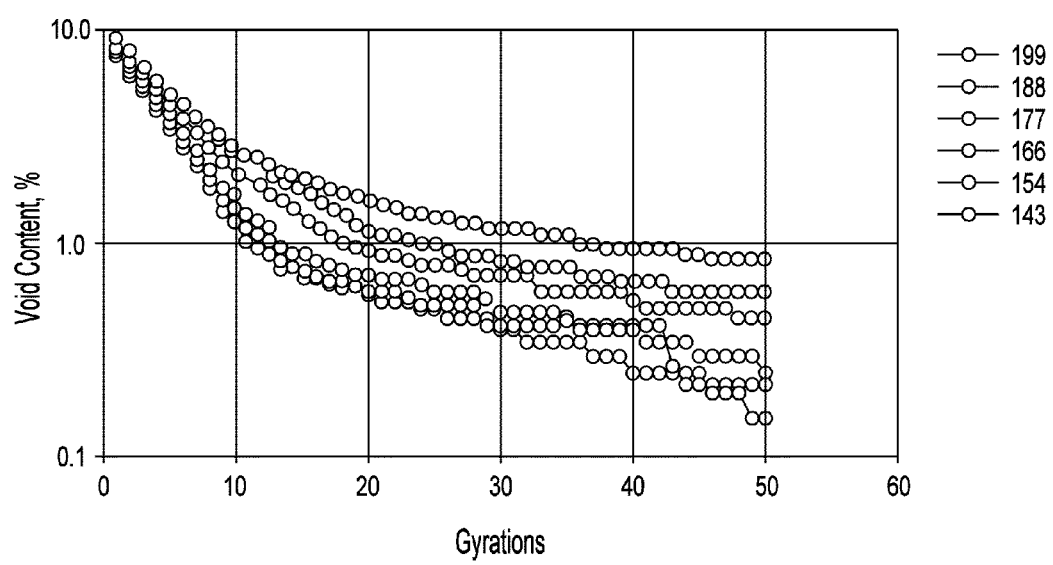
FIG. 1 is a graphical representation of compaction curves for PMM plant production runs using a Superpave gyratory compaction device at compaction temperatures between 143 degrees C. and 199 degrees C.

In the present invention, polymer modified binder (PMB) is formed by the combination of a dry mix agent (hereinafter referred to as a plant mix modifier (PMM) or plant mix modifying agent) and asphalt. The asphalt may be refinery production asphalt or asphalt from any other source. The resulting PMB is combined with aggregate and an additional asphalt binder to produce a bituminous paving composition such as HMA that conforms to Superpave specifications. The present invention is not so limited, as the PMB may be formed using PMM and used to produce other types of paving compositions. As used herein, the term "PMB" may include or be interchangeable with "polymer modified asphalt" and "bitumen."

In forming the PMB, polymers (both elastomers and plastomers), waxes, oils, and fillers are combined to produce a PMM defined by a free flowing granular particulate material which can be combined with asphalt. This PMB can be used in, substituted for, or used in conjunction with pre-blended PMB in an HMA facility to produce polymer modified binder HMA. The PMM can be added to the asphalt via reclaimed aggregate feed, filler silos, or directly to the mixing unit of an HMA facility, as examples. The blending techniques adopted result in the avoidance of special tanks for storage of PMB at HMA facilities and provides HMA facilities with a large degree of flexibility for HMA production.

In the development of a PMM for HMA production, one consideration is the mixing and compaction temperatures used with the process of the HMA production. Since some asphalt binders combined with the PMB used in the production of the HMA tend to produce excessive smoke and fumes as mixing and compaction temperatures are increased, and since additional fuel is also consumed for the heating and drying of aggregates, the maximum desirable temperature for HMA production is approximately 190 degrees C.

In a first type of plant, the aggregate is heated in a rotatable drum using a flame from an oil or gas burner. Upon rotation of the drum, the aggregate is heated by the flame and the resulting hot environment produced in the drum. In one variety of plants for the production of HMA (drum mix plants), the rotating drum serves a further purpose in that part of the drum is essentially the mixing chamber in which liquid asphalt is then combined with the aggregate to produce the HMA, or PMB if a polymer modified binder HMA is to be produced. The drum is designed to provide a flame profile which does not damage the asphalt binder being added. Reclaimed asphalt pavement (RAP) may also be mixed with materials in the drum.

A second type of plant uses the drum for only heating and drying of the aggregate. After passing the aggregate through the drum, the aggregate is stored in hot storage bins. The aggregate is then combined with asphalt binder or PMB in a mixing unit referred to as a pug-mill. This type of plant is called a batch mix plant. In a batch mix plant, RAP can be added directly to the pug-mill via an RAP feed. In addition to the possible adding of RAP, both types of plant will typically contain feed systems for the incorporation of mineral fillers (fine powder type materials). The use of either RAP feed systems or filler systems for the addition of a PMM enables an alternate production system for polymer modified binder HMA.

In the design of the PMM as an additive for incorporation into the PMB, enhancements with regard to the structural parameters and performance characteristics of the finished asphalt paving composition are made. Such enhancements produce a finished asphalt paving composition characterized by resistance to low temperature cracking, flexibility, toughness, and resistance to cracking and permanent deformation at high temperatures.

To achieve the desired design parameters of the PMM, a blend of products and a system of combination is considered. In a first stage, a elastomeric polymer is finely ground and pre-swelled by the addition of oil. The incorporation of oil provides for improved relaxation properties at low temperatures (as compared to known blends of products) while the incorporation of the elastomeric polymer provides for flexibility and toughness, resistance to cracking, and high temperature resistance for permanent deformation. A second stage then involves the addition of finely ground plastomer, additional elastomeric polymer, and wax. These materials increase the ability of a paving composition into which the PMM is incorporated to withstand permanent deformation while selection of the amounts and properties of these materials enables low temperature properties and flexibility to be maintained. These types of materials, when selected, also assist in reducing the compaction temperature of the mixture. A third stage of the development then combines these materials with a powder filler modifier. The powder filler modifier, when added to the asphalt binder, provides for increased toughness of the resulting mixture by further acting as an extender and increasing the volume of the combined materials without substantially altering the properties of the mixture. In addition, the powder filler modifier facilitates the formation of the resulting mixture into a powder, pellet, granule, chip, or flake form so as to provide a free flowing material. Selection of the powder filler modifier also imparts other benefits such as protection against moisture damage, controlled stiffness increase for heavy duty pavements, etc.

One exemplary PMM for addition to the HMA comprises about 39 wt. % (weight percent) styrene-butadiene-styrene (SBS) polymer, styrene-ethylene-butadiene-styrene (SEBS) polymer, styrene-isoprene-styrene (SIS), and/or other thermoplastic material or plastomer (e.g., ethylene vinyl acetate (EVA), polyethylene (including, but not limited to, oxidized polyethylenes such as EPOLENE EE2, a medium density polyethylene material available from Westlake Chemical Corporation, Houston, Tex.), polyolefins, and the like); about 27 wt. % naphthenic or paraffinic oil; about 15 wt. % to 35 wt. % fillers (e.g., one or more of coal dust, carbon black, limestone, silica, Gillsonite, and the like); and optionally a small amount of antioxidant. In one asphalt processing method, HMA (or a similar job mix formulation) is modified to have less than 2% air voids. Other methods involve designing job mix formulations of asphalt having 4-7% air voids using formulated polymers at higher degrees of concentration and mixing using high-shear blending techniques. In any asphalt processing method, the package added to the asphalt to form the PMB is a PMM that includes polymers, oils, and fillers in amounts suitable to provide an asphalt paving composition having a consistency suited for application, having compaction qualities that are suited for forming the pavement surface, and having long-term durability. Referring to FIG. 1, compaction curves for dry mix additive plant production runs show the compaction qualities for three different asphalt samples. Once the desired formulation of the package is finalized, processing is scaled up and carried out in a plant to produce the polymer modified binder HMA.

Example 1

An asphalt paving composition comprising polymer modified binder HMA was produced serving as both a water-proofing asphalt mix and a wearing course asphalt mix. A polymer formulation was used to provide a PMM that can be added directly to an asphalt production plant and combined with selected binders and aggregate to form an asphalt composition for paving having a desired degree of impermeability. The polymer formulation enabled the final asphalt composition to be rated at a higher value per AASHTO M320 Table 3 (extreme classification when evaluated at 70 degrees C.), Flexible Beam Fatigue in excess of 1,000,000 cycles at 750 micro-strains, 10 Hz, (mixture with 1.5% air voids), and impermeable as characterized by tests in ASTM D5084 which show that typical samples have a hydraulic conductivity of less than $10^{-7}$ cm/sec.

The PMM employing the polymer formulation can be utilized in batch, counter-flow, or parallel flow asphalt production plants. Because the polymer formulation provides a dry mix additive, the PMM can be supplied from bags or the like instead of as a liquid that is maintained within a specific temperature range. In this example, the PMM was added in polyethylene bags directly to the asphalt production plant. The bag and the total contents thereof were added with the bag melting due to the heat and also being incorporated into the asphalt composition.

The formulation of the PMM was:

| Material type | Examples | Typical ranges (wt. %) | Demonstrative Example | Percent considered (wt. %) |
| --- | --- | --- | --- | --- |
| Elastomers | SBS, SEBS, SIS | 10-40% | Dynasol-Solprene 411 SBS-Porous Crumb-30% styrene | 22.4% |
| Plastomers | EVA, polyethylene, polyolefin materials | 5-30% | MDPE (EPOLENE EE2) | 17.2% |
| Waxes | Bisstearamid, Licomont, Sasobit | 5-20% | Fatty Acid Amides, N,N'-Ethylene Bisstearamide | 6.9% |
| Oil | Naphthenic, Paraffinic | 10-35% | Corsol 2400-Naphthenic Oil | 27.2 |
| Fillers | Coal dust, carbon black, limestone filler, nano-silica, Gillsonite, antioxidant | 15-35% | Coal dust | 26.3 |
| Total | | | | 100% |

In a method of using the PMM in the processing of the asphalt composition for paving, the aggregate was run through the asphalt production plant until a constant mix temperature between about 175 and about 220 degrees C. was maintained and verified through dry mix drops and temperature checks. Other means of verifying the constant mix temperature could have been used. Once the constant temperature was attained, processing continued by mixing the hot aggregate, adding the PMM (and dry mixing for 10 seconds), and then adding a PG asphalt binder (and mixing for a further 70 seconds). The PG asphalt binder was chosen based upon the particular climate of the location in which the polymer modified binder HMA will be used for paving. After adding the PMM, the final mix temperature of the polymer modified binder HMA was approximately 150 to about 190 degrees C. leaving the asphalt production plant.

Various parameters of processed aggregate and mix design combination used in laboratory trials are given as the components thereof and are shown in Table 1.

TABLE 1

| Parameters of processed asphalt and components thereof. | | | | |
| --- | --- | --- | --- | --- |
| | Averages | Marshall Information | | |
| % Asphalt | 5.50 | Actual Values | | |
| % Voids | 0.99 | 0.89 | 1.11 | 0.98 |
| % VMA | 18.7 | 18.6 | 18.7 | 18.6 |

TABLE 1-continued

Parameters of processed asphalt and components thereof.

| | | | | |
|---|---|---|---|---|
| % VFA | 94.7 | 95.2 | 94.1 | 94.7 |
| % Vb | 17.66 | 17.68 | 17.64 | 17.66 |
| % Vs | 81.35 | 81.43 | 81.26 | 81.36 |
| Stability | 2225 | 2289 | 2207 | 2180 |
| Flow | 24.8 | 25.5 | 24.0 | 25.0 |
| Gmm | 2.568 | 2.568 | 2.568 | 2.568 |
| Gmb | 2.542 | 2.545 | 2.540 | 2.543 |

Percent (%) Passing

| Sieve Size | | Agg #1 | Agg #2 | Agg #3 | Designed Blend | Wet Sieve Data |
|---|---|---|---|---|---|---|
| 3/4" | 19.0 mm | 100.0 | 100.0 | 100.0 | 100.0 | 100.0 |
| 1/2" | 12.5 mm | 100.0 | 100.0 | 100.0 | 100.0 | 100.0 |
| 3/8" | 9.5 mm | 96.0 | 100.0 | 100.0 | 98.1 | 98.3 |
| #4 | 4.75 mm | 25.9 | 100.0 | 100.0 | 64.4 | 64.5 |
| #8 | 2.36 mm | 7.0 | 75.0 | 98.1 | 45.8 | 46.1 |
| #16 | 1.18 mm | 5.9 | 53.6 | 91.8 | 36.4 | 37.0 |
| #30 | 600 micro | 4.3 | 36.3 | 76.1 | 26.9 | 28.2 |
| #50 | 300 micro | 2.1 | 30.0 | 31.0 | 16.8 | 19.1 |
| #100 | 150 micro | 1.6 | 18.5 | 5.0 | 8.4 | 9.9 |
| #200 | 75 micro | 1.5 | 14.8 | 1.0 | 6.3 | 7.6 |
| % in Designed Blend | | 48.0 | 37.0 | 15.0 | | |

| | Materials | Bulk Specific Gravities | % Agg Only | % Total Corrected for AC & Rosphalt | Weight (#) Aggregate per Ton Mix |
|---|---|---|---|---|---|
| Agg #1 | 8's | 2.932 | 48.0 | 44.2800 | 885.600 |
| Agg #2 | 10's | 2.921 | 37.0 | 34.1325 | 682.650 |
| Agg #3 | Sand | 2.657 | 15.0 | 13.8375 | 276.750 |
| Asphalt | PG 64-22 | 1.035 | | 5.5000 | 110.000 |
| Additive | Rosphalt 50 | 0.984 | | 2.2500 | 45.000 |
| | | | Totals | 100.00 | 2000.00 |
| | | Gsb | 2.883 | | |
| | | Gse | 2.947 | | |

In Table 2, the effect of the PMM on the resistance to permanent deformation as demonstrated by the multiple-stress creep and recovery test is shown. The performance in this test demonstrates that the PMM modified PG asphalt binder will have a high level of performance in a polymer modified binder HMA.

TABLE 2

Evaluation of material properties in multiple stress creep and recovery (MSCR) test which demonstrates the difference obtained when modification has taken place with the PMM of the present invention (referenced as ROSPHALT LT-in this Table)

| Performance measure | Stress level | PG64-22 | 5.5% + Rosphalt LT | 6.5% + Rosphalt LT |
|---|---|---|---|---|
| Jnr (non-recoverable creep compliance), 1/kPa | 100 Pa | 5.39 | 0.0002 | 0.008 |
| | 3200 Pa | 6.09 | 0.027 | 0.122 |
| Elastic recovery, % | 100 Pa | 1 | 100 | 93 |
| | 3200 Pa | 0 | 75 | 59 |
| Total permanent strain, % | 100 Pa | 543 | 0.103 | 0.793 |
| | 3200 Pa | 20,144 | 95.7 | 374 |
| Percent of strain compared to unmodified PG64-22, % | 100 Pa | 100 | 0.0 | 0.1 |
| | 3200 Pa | 100 | 0.5 | 1.9 |

Using the PMM, a mixture was designed with an air void content about or less than 2%. This was achieved by the addition of the PMM in a suitable percentage from 2.25% down to 1.125% depending upon the desired application of the asphalt and climate. One such application and use may be for a one-step paving lift (layer) for placement on bridges, approaches, overhead structures, or roads. In such a one-step paving lift, the lift is preferably designed in a Gyratory compactor using 50 cycles for $N_{des}$. Furthermore, in such a one-step lift, about 100% of the aggregate material is able to pass a 4.5 mm, 9.5 mm, or 12.5 mm sieve design.

As is shown in FIG. 2, data pertaining to the amount of voids per unit volume of aggregate material and the amount of PG asphalt binder used is shown using both Marshall and Gyratory methods. The Marshall method is one method of determining the stability and flow of asphalt in a pavement structure. The Gyratory method is one method used to assess volumetric properties and predict pavement performance by independently measuring an internal angle of gyration of a pavement structure under simulated loading conditions.

Figure 3:
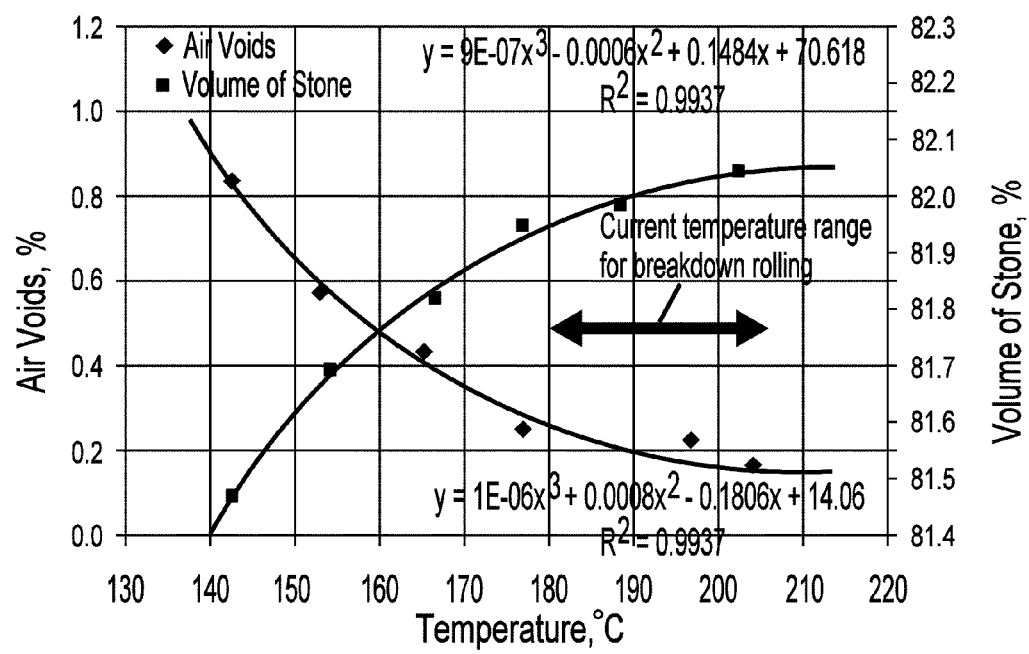
FIG. 3 is a graphical representation of the effect of compaction temperature on air voids in asphalt samples using the Gyratory testing method.

As is shown in FIG. 3, the effect of compaction temperature on air voids after 50 gyrations using the Gyratory method is shown.

Utilizing the PMM offers flexibility with regard to fatigue resistance and impermeability of asphalt compositions for paving. Impermeability is achieved by facilitating the closing of voids in the aggregate material using the PG asphalt binder. The PMM also allows for the use thereof with standard manufacturing, processing, and paving equipment.

Figure 4:
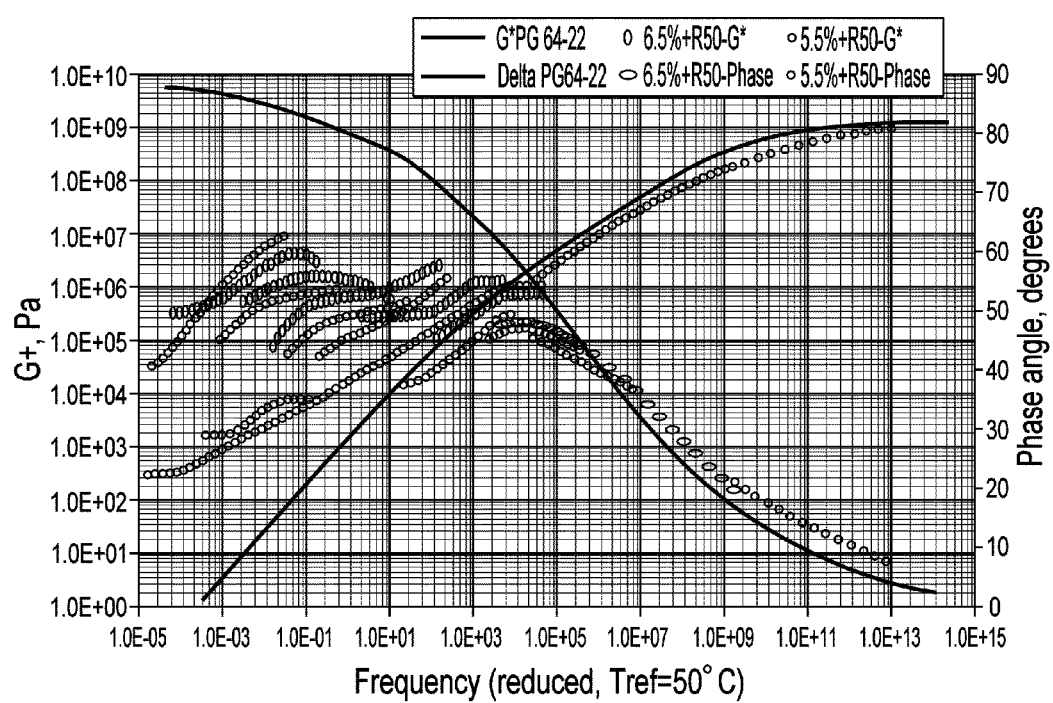
FIG. 4 is a graphical representation of the modification of an asphalt paving composition with PMM to enable reduction in high stiffness properties and increase in low stiffness properties of a PMB within the total range of available temperatures and loading times.

FIG. 4 shows the properties of the PMM combined with the PG64-22 binder when evaluated with a rheometer. In this Figure, the high and low stiffness properties have been modified to produce a lower stiffness at the high stiffness end of the range and a higher stiffness at the low stiffness end of the range.

The performance of this mixture was further proven by conducting low temperature fracture fatigue and deformation tests on the mixture.

Figure 5:
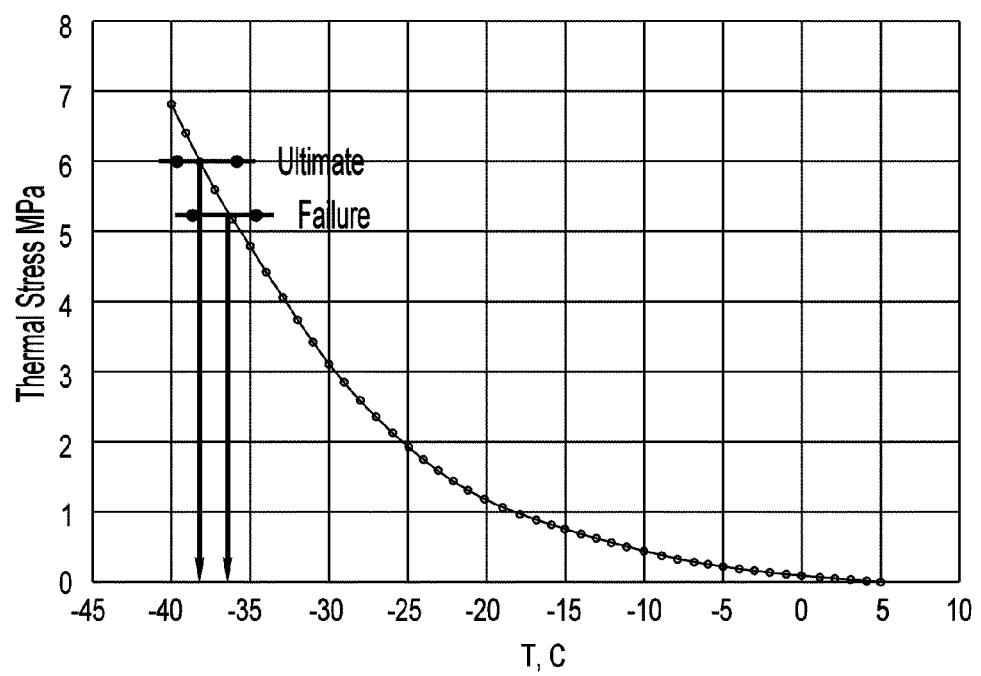
FIG. 5 is a graphical representation of low temperature performance of an asphalt paving composition incorporating PMM showing an expected cracking temperature of about −36 degrees C. to about −38 degrees C.

FIG. 5 illustrates the low temperature performance of a PG64-22 modified with the PMM. The performance of the mixture as evaluated with the indirect tension test shows a performance level approaching a −40 grade. As is shown in FIG. 5, in this case a −34 grade would be attainted by the mixture.

Figure 6:
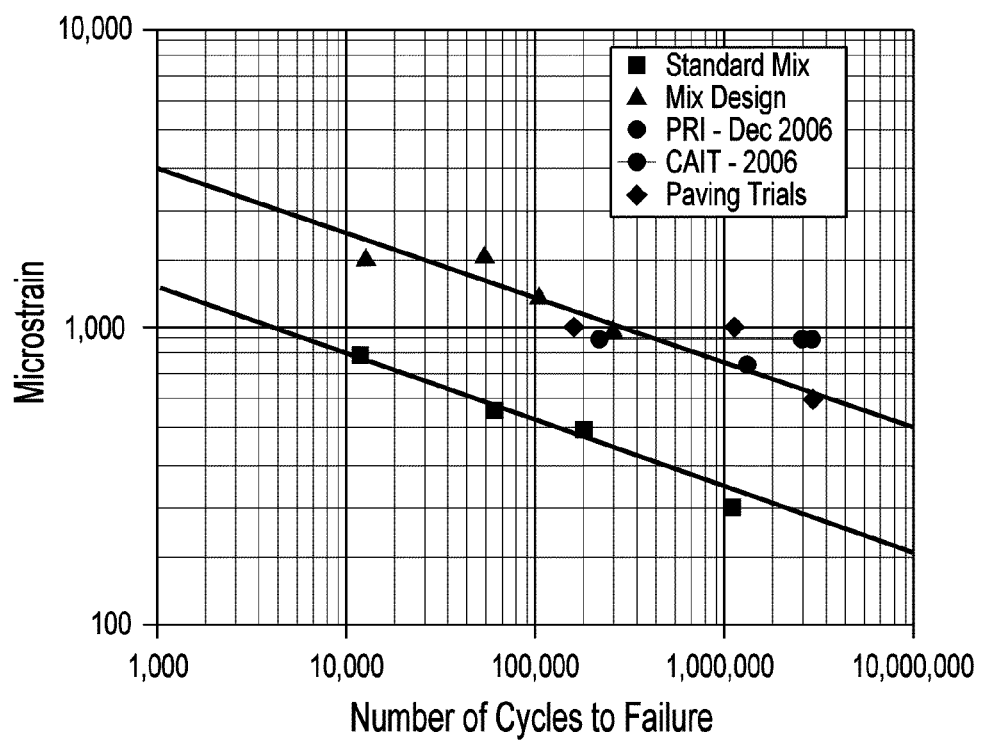
FIG. 6 is a graphical representation of the fatigue performance of an asphalt paving composition incorporating PMM.

FIG. 6 illustrates the fatigue performance of this mix design (the data points of the upper line) and demonstrates that the PMM significantly increases the fatigue performance of the mixture compared to conventional HMA. The fatigue performance of the HMA incorporating the PMM shows that the HMA would have an expected 1,000,000 load cycles at 750 micro-strain. Data in the graph compares a typical HMA with HMA incorporating PMB that is formulated using the PMM of the present invention. The data points shown are from various trials, a composition comprising the polymer modified binder as described in Example 1, and other data from paving materials made with an older formulation produced at high temperatures.

Figure 7:
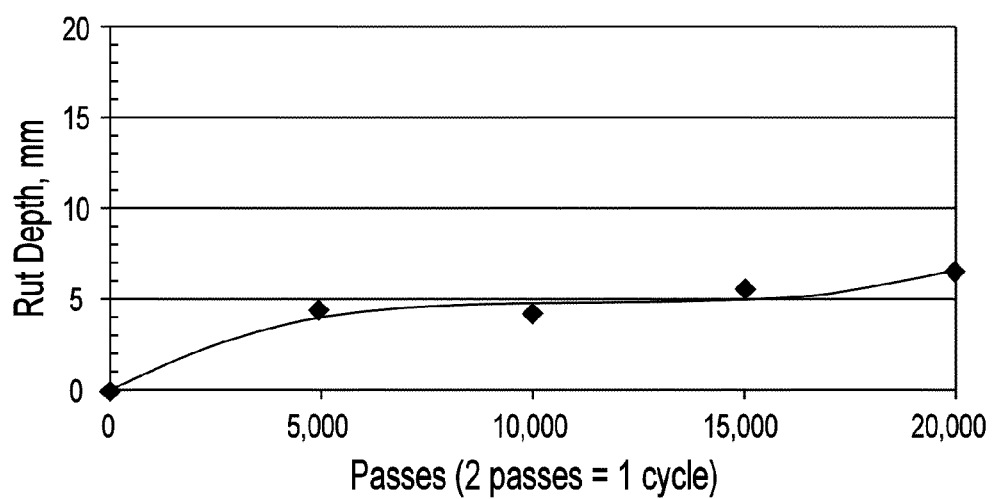
FIG. 7 is a graphical representation of the deformation of material when evaluated in a Hamburg wheel tracking device.

FIG. 7 demonstrates the deformation potential of the mixture when evaluated in a Hamburg wheel tracking device. The data further suggests that the mix will have acceptable performance with respect to wheel tracking when used in road pavements.

Example 2

A series of trials was conducted with the same formulation as used in Example 1 but scaled up for full scale production. The objective of the trial was to further verify that materials can be compacted as demonstrated in the lab trials and that performance is achieved.

Figure 8:
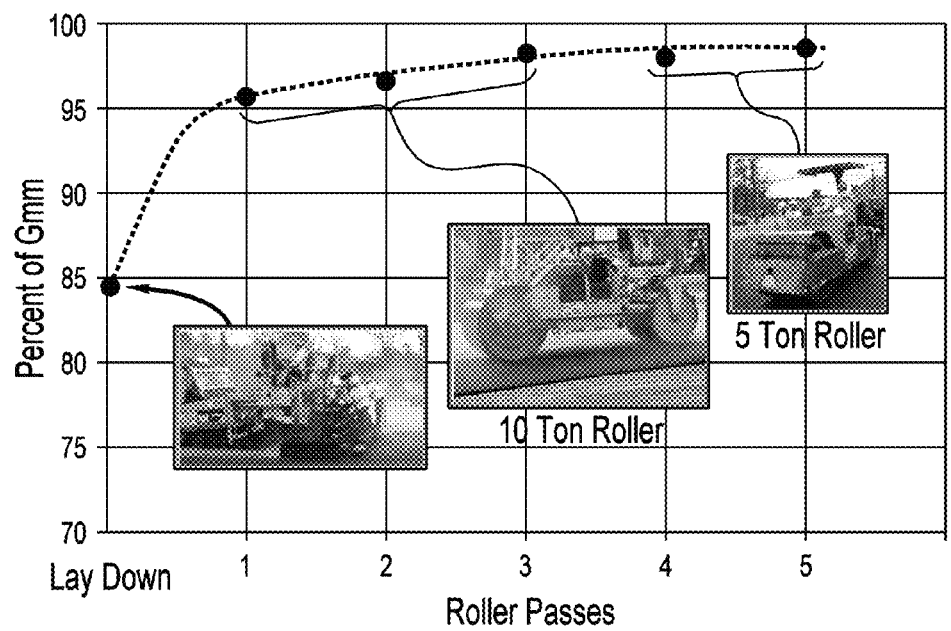
FIG. 8 is a graphical representation of the compaction of an asphalt paving composition.

The field compaction ability of the material is demonstrated in FIG. 8 which demonstrates that the mixture can be compacted rapidly using normal compaction equipment. The data shown in FIG. 8 illustrates that a rapid gain in density is achieved.

Further data is shown in FIG. 6 (Trials #1 and #2) that demonstrates that the material has the same fatigue resistance although it has been produced in a HMA mixing plant rather than in the laboratory.

Figure 9:
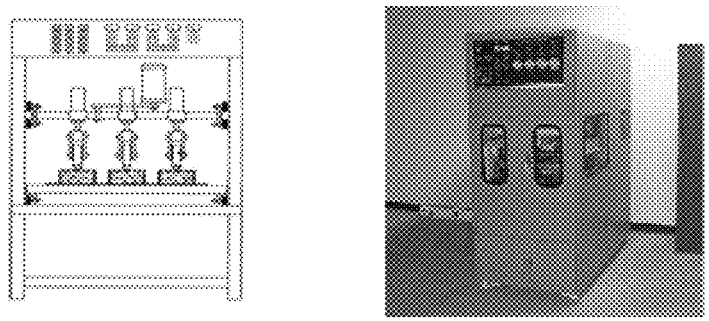
FIG. 9 is a graphic illustrating the performance of an asphalt paving composition in an Asphalt Pavement Analyzer (APA).

FIG. 9 shows the performance when assessed for deformation potential when testing in a wheel tracking apparatus at 64 degrees C.

The data from the paving trials proves that the mix design information can be implemented with mixtures produced in HMA production facilities while maintaining excellent performance.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

The invention claimed is:

1. A plant mix modifier for asphalt production, the modifier comprising:
   a thermoplastic material;
   oil;
   filler additives; and
   about 6 wt. % to about 20 wt. % of N,N'-ethylene bisstearamide;
   wherein the plant mix modifier is a free-flowing powder of discrete particles, each discrete particle including only one of i) the thermoplastic material, ii) the N,N'-ethylene bisstearamide, and iii) the filler additives, the plant mix modifier configured to mix with an asphalt binder and aggregate to form a hot mix asphalt.

2. The plant mix modifier of claim 1, wherein the hot mix asphalt is mixed at working temperatures associated with the production thereof.

3. The plant mix modifier of claim 1, wherein the resulting hot mix asphalt conforms to Superpave specifications.

4. The plant mix modifier of claim 1, wherein the thermoplastic material comprises an elastomer or a plastomer.

5. The plant mix modifier of claim 4, wherein the elastomer comprises one or more of styrene-butadiene-styrene polymer, styrene-isoprene-styrene polymer, and styrene-ethylene-butadiene-styrene polymer.

6. The plant mix modifier of claim 5, wherein the elastomer is present in an amount of about 10 wt. % to about 40 wt. %.

7. The plant mix modifier of claim 4, wherein the plastomer comprises one or more of ethylene vinyl acetate, polyethylene, and polyolefin.

8. The plant mix modifier of claim 7, wherein the plastomer is present in an amount of about 5 wt. % to about 30 wt. %.

9. The plant mix modifier of claim 1, wherein the oil is selected from the group consisting of naphthenic oil, paraffinic oil, and combinations of the foregoing materials.

10. The plant mix modifier of claim 1, wherein the filler additives are selected from the group consisting of coal dust, carbon black, limestone, silica, Gillsonite, and combinations of the foregoing materials.

11. The plant mix modifier of claim 1 wherein the content of thermoplastic material is greater than 10 wt. % of the plant mix modifier.

12. A plant mix modifier for asphalt production, the modifier comprising:
   about 10 wt. % to about 40 wt. % of an elastomer;
   about 5 wt. % to about 30 wt. % of a plastomer;
   about 6 wt. % to about 20 wt. % of N,N'-ethylene bisstearamide;
   about 10 wt. % to about 35 wt. % of oil that comprises one or both of naphthenic oil and paraffinic oil; and
   about 15 wt. % to about 35 wt. % of filler additives;
   wherein the plant mix modifier is a free-flowing powder of discrete particles, each discrete particle including only one of i) the elastomer, ii) the plastomer, iii) the N,N'-ethylene bisstearamide, and iv) the filler additives, the plant mix modifier configured to mix with an asphalt binder and aggregate to form a hot mix asphalt.

13. The plant mix modifier of claim 12, wherein the hot mix asphalt is capable of sustaining high traffic loading and is impermeable as defined by a hydraulic conductivity of up to about $1 \times 10^{-7}$ cm/sec.

14. The plant mix modifier of claim 12, wherein the resulting hot mix asphalt can be used for bridge decks, mastic asphalt, Guasphalt, and Marshall Asphalt.

15. The plant mix modifier of claim 12, wherein the resulting hot mix asphalt can be used in at least one of a remote location and a location where liquid polymer modified asphalt cannot be supplied.

16. The plant mix modifier of claim 12 wherein the elastomer is grounded.

17. The plant mix modifier of claim 16 wherein the elastomer is pre-swelled by both of naphthenic oil and paraffinic oil.

18. The plant mix modifier of claim 12 wherein the plastomer is grounded.

* * * * *

UNITED STATES PATENT AND TRADEMARK OFFICE
CERTIFICATE OF CORRECTION

PATENT NO. : 9,493,653 B2
APPLICATION NO. : 13/042908
DATED : November 15, 2016
INVENTOR(S) : Rowe et al.

It is certified that error appears in the above-identified patent and that said Letters Patent is hereby corrected as shown below:

In the Specification

Column 5, Line 24, delete "Gillsonite" and insert -- Gilsonite -- therefor.

Column 6, Line 34, delete "Gillsonite" and insert -- Gilsonite -- therefor.

In the Claims

Column 10, Line 41, in Claim 10, delete "Gillsonite" and insert -- Gilsonite -- therefor.

Signed and Sealed this
Twenty-eighth Day of March, 2017

Michelle K. Lee
*Director of the United States Patent and Trademark Office*